US010562463B1

(12) United States Patent
Speer et al.

(10) Patent No.: US 10,562,463 B1
(45) Date of Patent: Feb. 18, 2020

(54) VEHICLE LOAD CARRIER WITH INTEGRATED HANDLING WHEELS

(71) Applicants: William W Speer, Sunnyvale, CA (US); Wayne L Speer, Sunnyvale, CA (US)

(72) Inventors: William W Speer, Sunnyvale, CA (US); Wayne L Speer, Sunnyvale, CA (US)

(*) Notice: Subject to any disclaimer, the term of this patent is extended or adjusted under 35 U.S.C. 154(b) by 0 days.

(21) Appl. No.: 16/021,277

(22) Filed: Jun. 28, 2018

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .. B60R 9/06; B60R 9/10; B60R 9/065; B60R 9/08
USPC .......................... 224/511, 512, 516, 518–521
See application file for complete search history.

(56) References Cited

U.S. PATENT DOCUMENTS

| 5,029,740 | A * | 7/1991 | Cox | B60R 9/065 |
| | | | | 190/15.1 |
| 9,375,986 | B1* | 6/2016 | Dykstra | B62B 1/00 |
| 9,643,669 | B1* | 5/2017 | Clark | B60D 1/07 |
| 2004/0173654 | A1* | 9/2004 | McAlister | B60D 1/52 |
| | | | | 224/519 |
| 2008/0296330 | A1* | 12/2008 | Kalous | B60R 9/06 |
| | | | | 224/519 |
| 2010/0260587 | A1* | 10/2010 | LeAnna | B60R 9/06 |
| | | | | 414/462 |
| 2015/0122859 | A1* | 5/2015 | Brinkley | B60P 3/10 |
| | | | | 224/512 |
| 2018/0022287 | A1* | 1/2018 | Sorey | B62B 3/00 |
| | | | | 224/519 |

* cited by examiner

*Primary Examiner* — Corey N Skurdal
(74) *Attorney, Agent, or Firm* — Useful Arts IP

(57) ABSTRACT

A hitch carrier is provided that for mounting does not require the user to lift the full weight of the carrier at once, that is free standing in an upright position when unattended, and that may be drag braked from rolling movement to being parked upright.

11 Claims, 9 Drawing Sheets

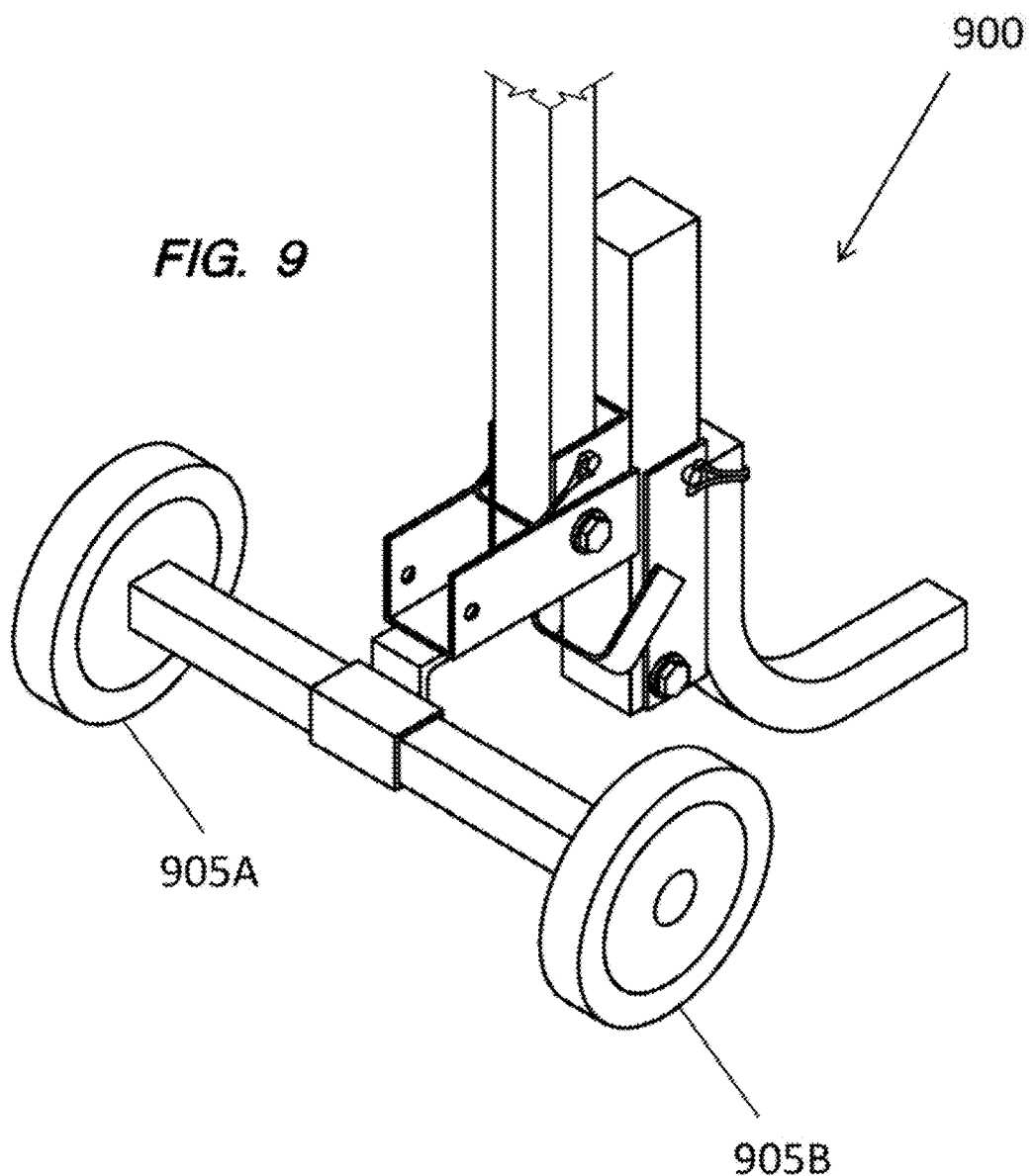

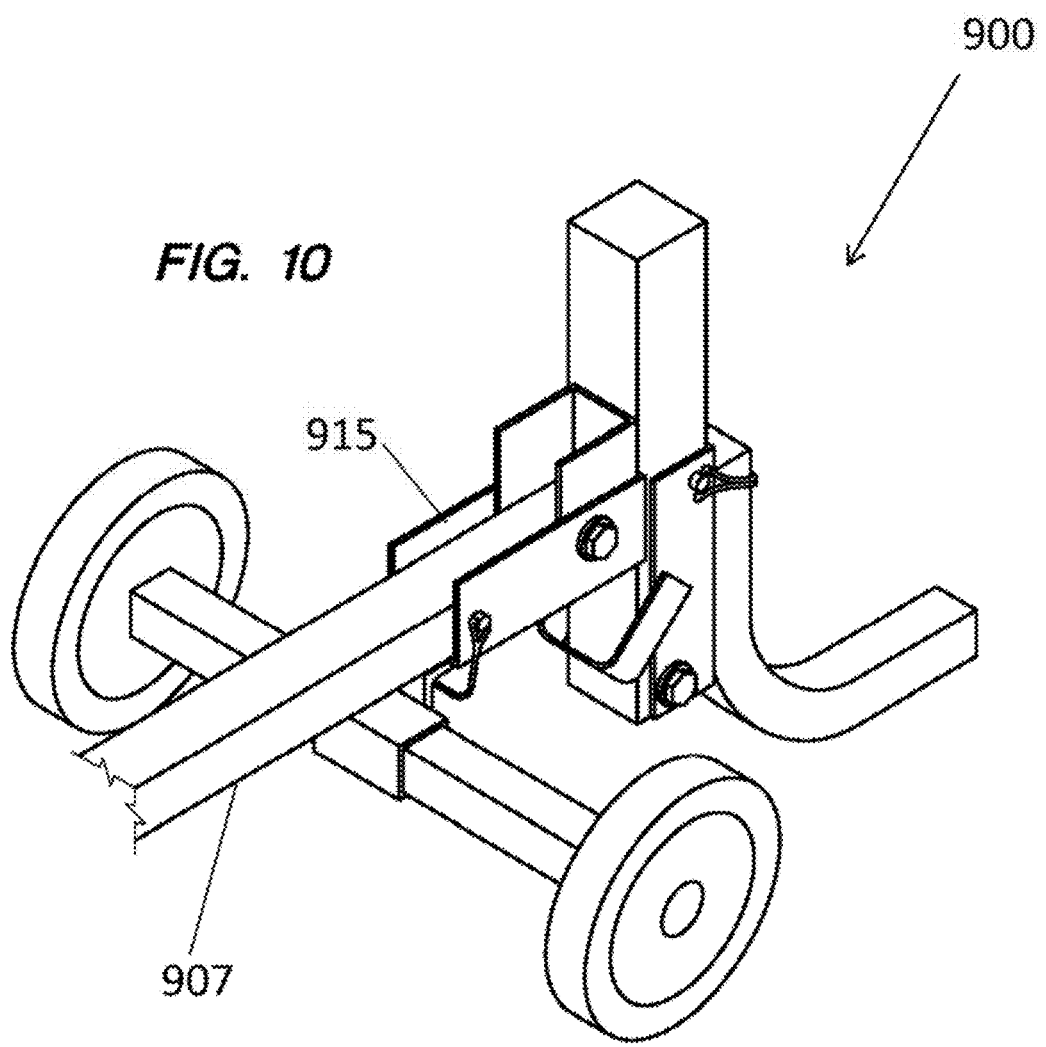

VEHICLE LOAD CARRIER WITH INTEGRATED HANDLING WHEELS

BACKGROUND

Load carriers attached to vehicle hitches are well known and widely used to transport various loads such as bicycles, camping gear, sports equipment and various cargoes. Carriers of this type are conventional and have a hitch bar in front that attaches to the hitch and a load carrying component attached to the rear of the hitch bar for supporting a load. Commonly, the load carrying component folds upward for compactness when not carrying a load. One example of such a carrier is described in U.S. Pat. No. 7,240,816 (application Ser. No. 10/945,386), incorporated herein by reference.

A common complaint about hitch carriers of current designs is that their heavy weight makes the carriers difficult to handle, lift, and install on a hitch. The major structural components are usually steel, and hitch carriers commonly weigh 50 pounds and upward. Hitch carriers presently in use require lifting of the complete carrier to align the hitch bar for installation on the hitch. The front mounted hitch bar offsets the lifting point center of gravity, making lifting awkward and difficult. Protruding hardware and parts can cause injury to persons as they handle the carrier to install, remove, and store it. Some carriers are assembled as modules during installation on the hitch as a way to manage the overall weight problem.

Storage is a problem with hitch carriers of current design when they are removed for periods of non-use. Often additional purchases are required to neatly and safely store hitch carriers. The task of storing requires lifting and handling.

Yet another problematic area for brick and mortar retailers is point of purchase displays. Usually a separate, immobile specialty display stand is required. The hitch carrier must be carried to the vehicle for pre-purchase fit checking and product demonstrations.

Examples may be found of hitch mounted load carriers and mobility stands that are provided with wheels. Nevertheless, further improvement is desired.

More particularly, examples may be found of bike carriers that fold so as to be very compact and that have integrated wheels used to roll the carrier from place to place. Nevertheless, the entire carrier must be lifted to install it on a hitch. Moreover, the wheels do not help display the rack unfolded.

It is known to provide a wheeled specialty stand used to roll bike racks from place to place and to display a bike rack. Nevertheless, a rack must first be removed from the stand and then fully lifted to install it on a vehicle. Additionally, in a typical case, the stand is supported on four swiveled caster wheels that must be manually locked to immobilize the stand.

Examples may be found of cargo carriers with wheels mounted under a basket of the cargo carrier for rolling the carrier from place to place. In this example, as with all of the examples cited, the user must lift the entire carrier to align and install the carrier on the hitch.

BRIEF DESCRIPTION OF THE DRAWING

The present invention may be understood from the following description in conjunction with the appended drawing figures. In the drawing:

FIG. 9 is a rear view of another trike carrier or rack provided with wheels.

FIG. 10 is a diagram of a carrier or rack like that of FIG. 10 showing non-interference of the wheels and a central column of the carrier or rack.

DETAILED DESCRIPTION

Summary

A hitch carrier is provided that does not require the user to lift the full weight of the carrier at once, that is free standing in an upright position when unattended, and may be drag braked from rolling movement to being parked upright.

In one embodiment, a rack or carrier includes a bar that is received within a receiver of a trailer hitch and multiple wheels aligned with respect to a common axis of rotation. The rack or carrier is attached to a trailer hitch of a vehicle by applying a levering action to the rack or carrier so as to cause rotation about the common axis of rotation and partially inserting the bar into the receiver. A lifting action is then applied to the rack or carrier with the bar partially inserted into the receiver, the receiver acting as a fulcrum, and the rack or carrier is pushed forward, causing the bar to be fully inserted into the receiver. The multiple wheels may be stowed in a horizontal position by action of loading the rack or carrier with a load, or the multiple wheels may remain in place without being stowed.

In another embodiment, a rack or carrier for mounting to a trailer hitch of a vehicle includes a multiple support members for supporting an item to be carried and multiple wheels coupled to the support members and having a configuration in which the multiple wheels are aligned with respect to a common axis of rotation. The rack or carrier is configured so as to enable it to be wheeled about using wheels that include only the multiple wheels. The engagement member may be curved such that in a full engagement condition, the multiple wheels are elevated to a greater extent as a result of the engagement member being curved. A weight distribution of the rack or carrier may be such that the rack or carrier stands upright supported by the multiple wheels and the engagement member without any additional support.

Description

Figure 1:
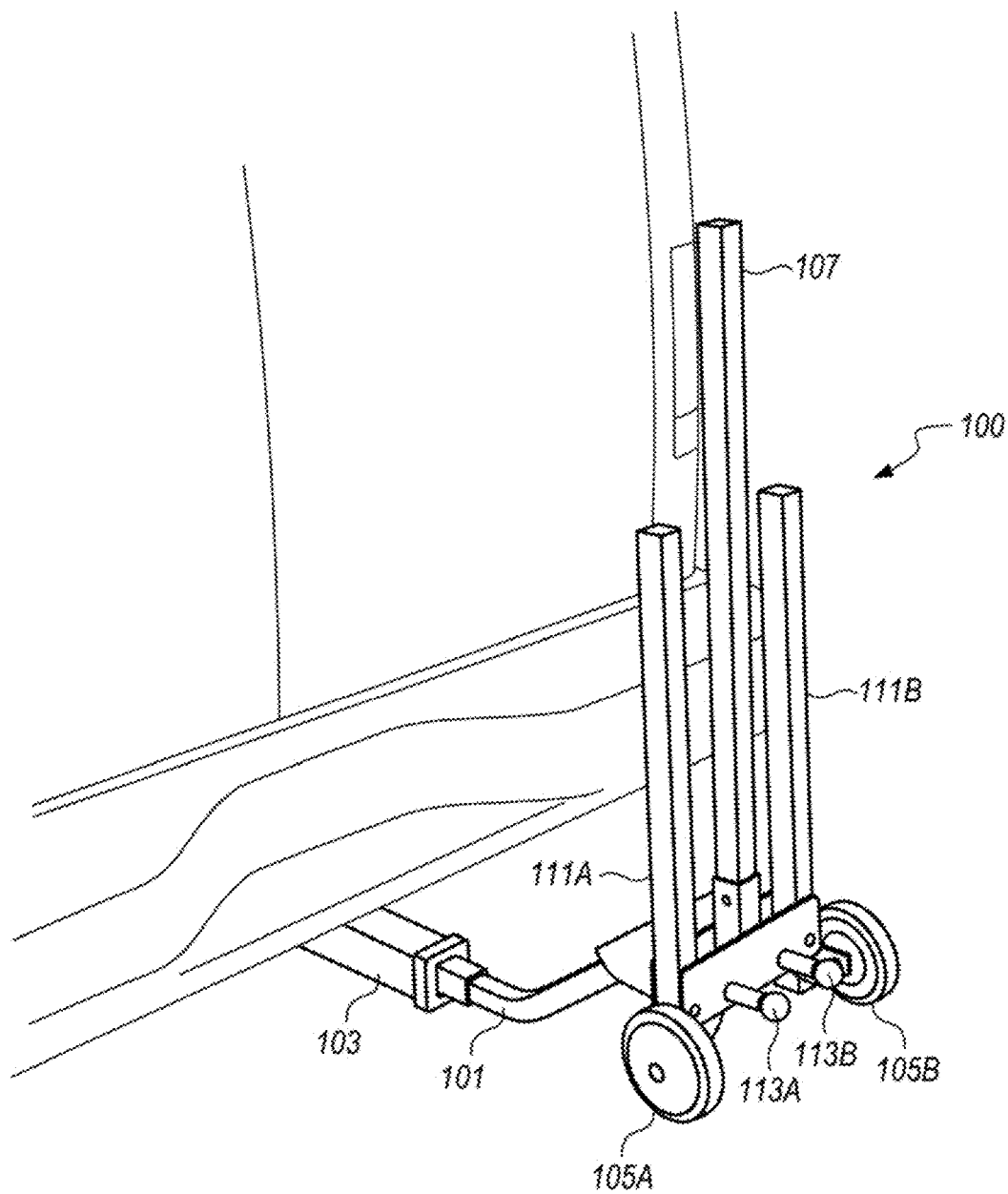
FIG. 1 is a rear view of a portion of a hitch-mounted carrier or rack provided with wheels.

Referring now to FIG. 1, a diagram is shown of a hitch carrier with integrated handling wheels. The hitch carrier is shown mounted to a trailer hitch of a vehicle.

Figure 5:
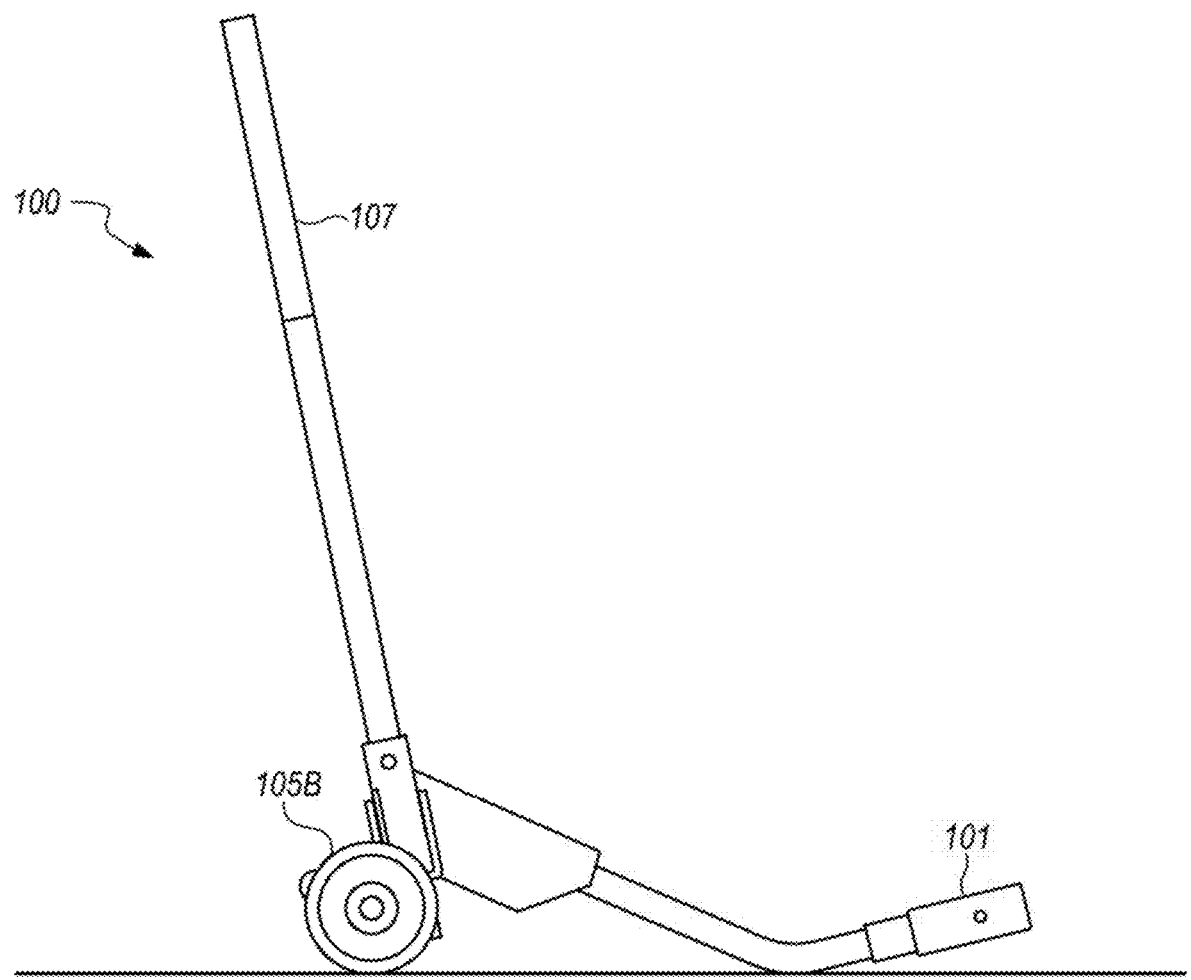
FIG. 5 is a diagram showing the carrier or rack of FIG. 1 in a self-standing position.

The hitch carrier 100 incorporates a hitch bar 101 in front that attaches to the hitch 103 and at least two wheels (105A, 105B) spaced apart and attached near the rear of the carrier. The wheels 105 cooperate with the hitch bar 101 in spaced relation to form a stable, free standing carrier with at least two wheels and the hitch bar 101 in contact with the ground as shown in FIG. 5. A user can then use any convenient part of the carrier as a handhold, such as a central column 107, and easily tip the carrier toward the rear from its free standing position. In the tipped back position the carrier is transformed into a push dolly and the carrier weight is borne by the wheels. The user then can easily push the carrier to any location for installation on a hitch, for storage, or for point of purchase display.

Figure 2:
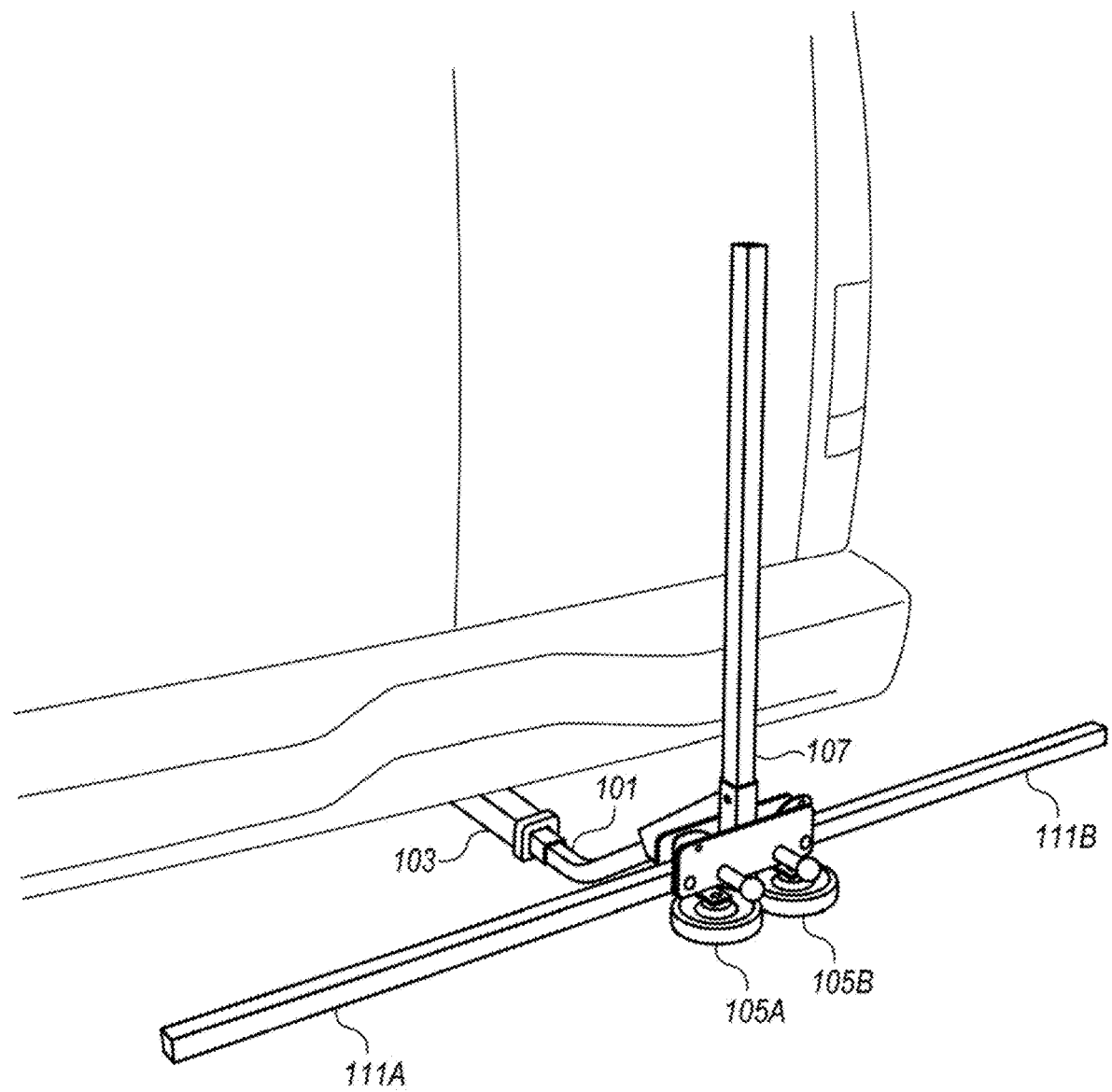
FIG. 2 is a diagram of the carrier or rack of FIG. 1 with the wheels in a stowed position.

The carrier may be provided with beam members 111A and 111B that pivot between a vertical position and a horizontal position in accordance with operation of spring pins 113A and 113B. The beam members 111 may provide support for a load such as one or more bicycles. In the case of a bicycle rack, additional application-specific members may be attached to the column 107 and the beam members 111 as described, for example, in U.S. Pat. No. 7,240,816. A view of the carrier with the beam members in the horizontal position is shown in FIG. 2.

Figure 3:
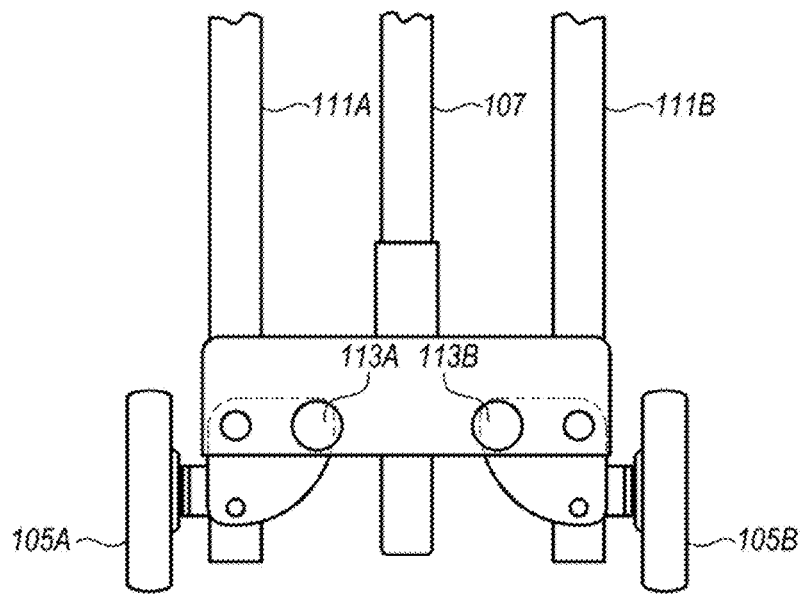
FIG. 3 is an enlarged view of a portion of the carrier or rack of FIG. 1 showing the wheel structure in greater detail with the wheels in an upright position.
Figure 4:
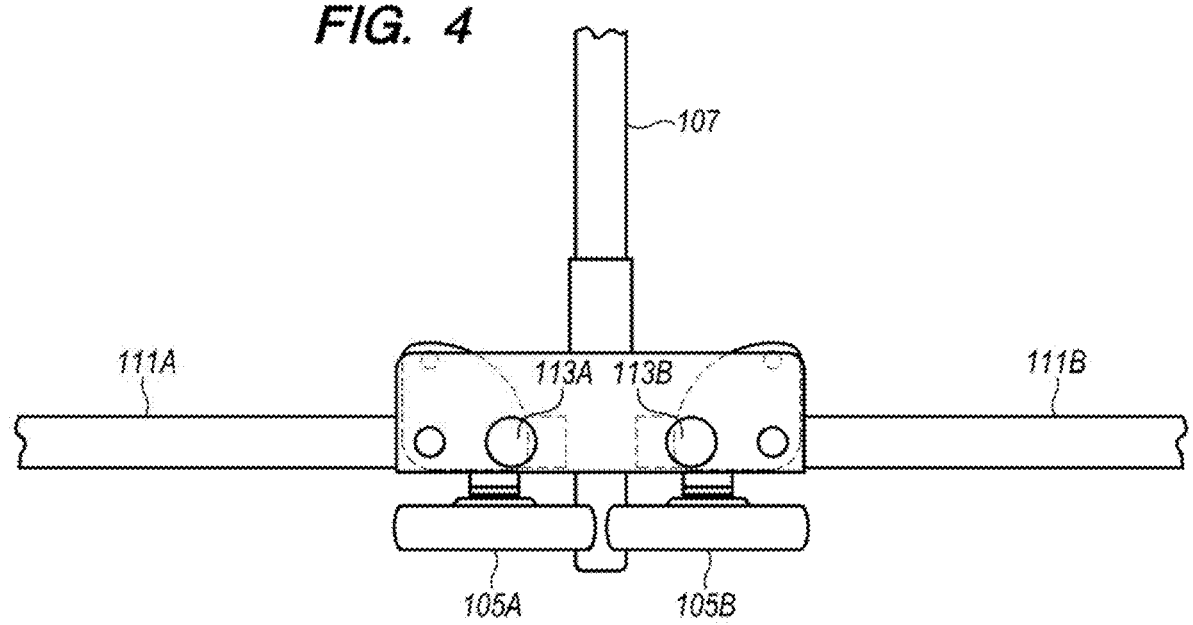
FIG. 4 is a view like that of FIG. 3 showing the wheels in a stowed position.

Additional details of a central portion of the carrier are shown in FIG. 3 (upright position) and FIG. 4 (horizontal position).

When installing the carrier the wheels 105 and variable tilt back angle features allow the user to steer and tip the carrier as a push dolly to vertically and laterally align and partially install the hitch bar 101 on the hitch 103. The front end of the hitch bar 101 then supports part of the carrier weight as the carrier back end is raised for full installation on the hitch 103. Sharing the load weight between the user and the vehicle hitch takes advantage of mechanical leverage and greatly reduces the total amount of lifting and aligning efforts required to install the carrier on the hitch.

Figure 6:
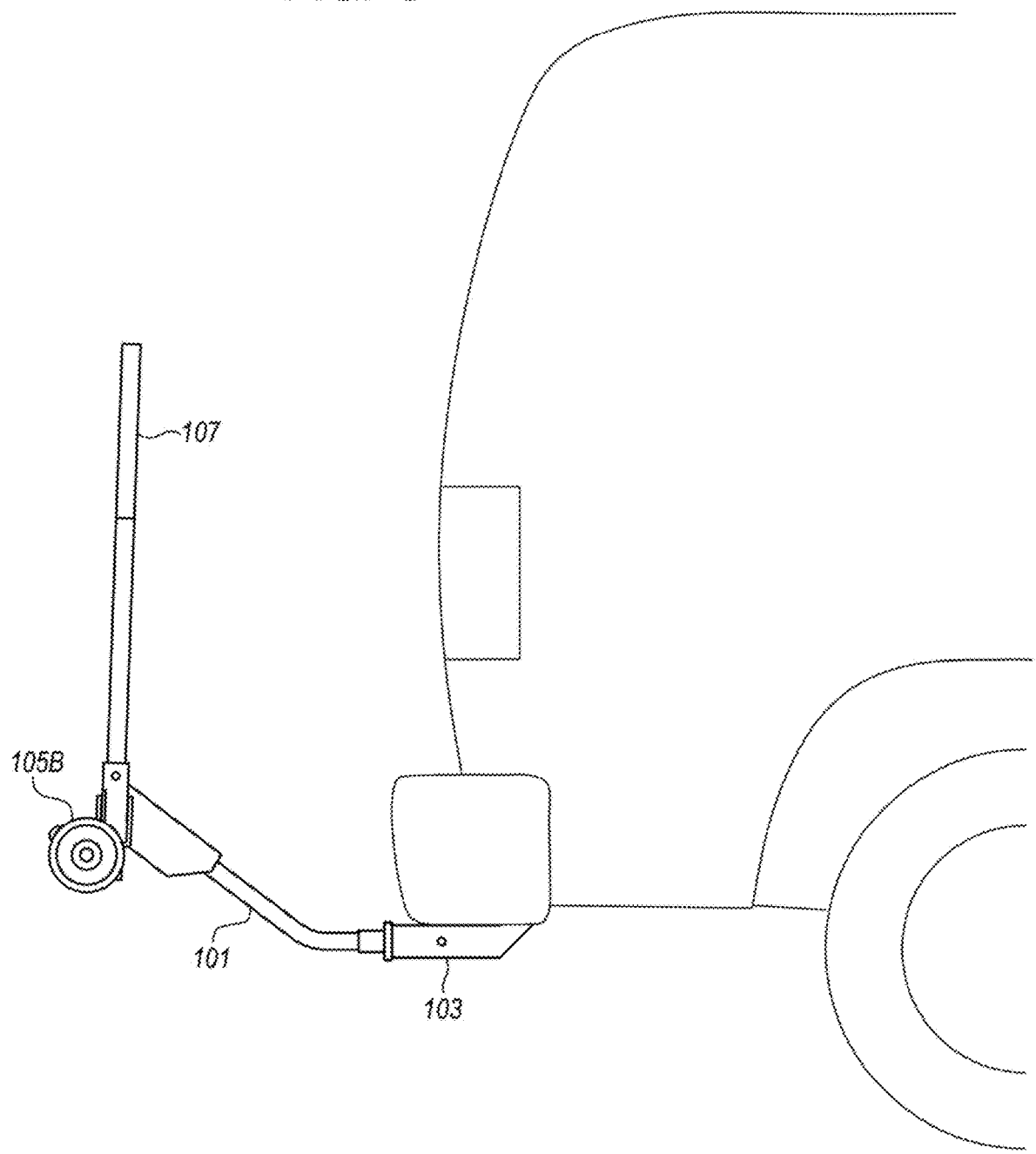
FIG. 6 is a side view of the carrier or rack of FIG. 1 showing how the arrangement of the carrier or rack results in elevation of the wheels above the hitch in a fully-engaged position.

A side view of the carrier 100 is shown in FIG. 6. In this embodiment, the handling wheels 105 are higher above the ground than the vehicle's hitch 103 to avoid the wheels dragging, when traversing pronounced dips, for example. However, this feature is optional. In other embodiments, the handling wheels 105 may be positioned at a height equal to or about ½ inch lower than the hitch 103 so as to share the load with the vehicle when negotiating steep driveways.

The wheels 105 may be attached to the carrier in any of various ways, such as pivotally, rotatably, telescopically, adjustably, removably, etc. The position of the handling wheels may also be designed to interact with another carrier function. For example, in the embodiment of FIG. 1 and FIG. 2, when the carrying component is folded for non-use (FIG. 1) the wheels extend, and when it is unfolded to carry a load (FIG. 2), the wheels retract. All of these methods of connecting and positioning the wheels are considered to be within the spirit and intent of the present invention.

Figure 7:
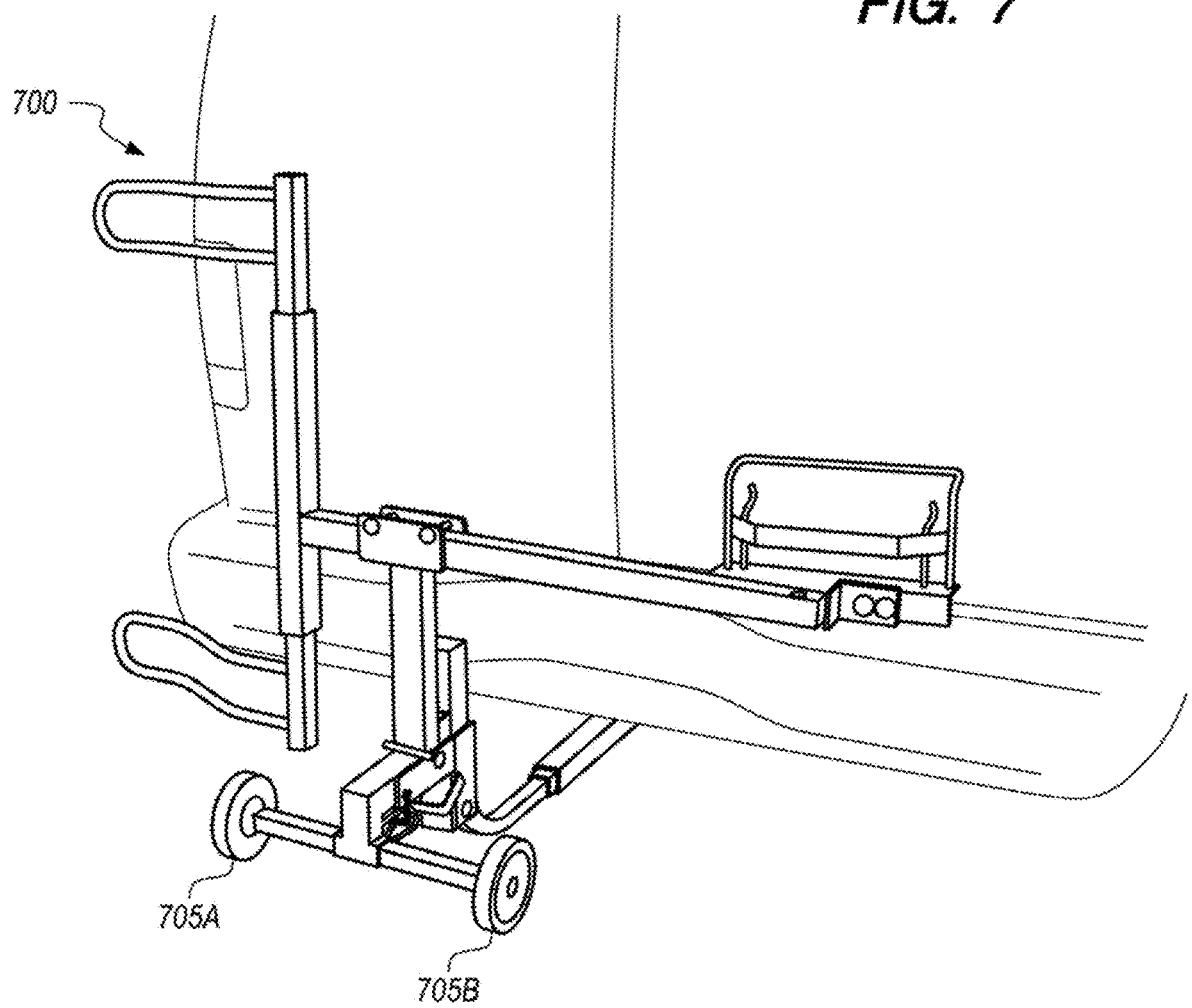
FIG. 7 is a rear view of a trike carrier or rack provided with wheels.
Figure 8:
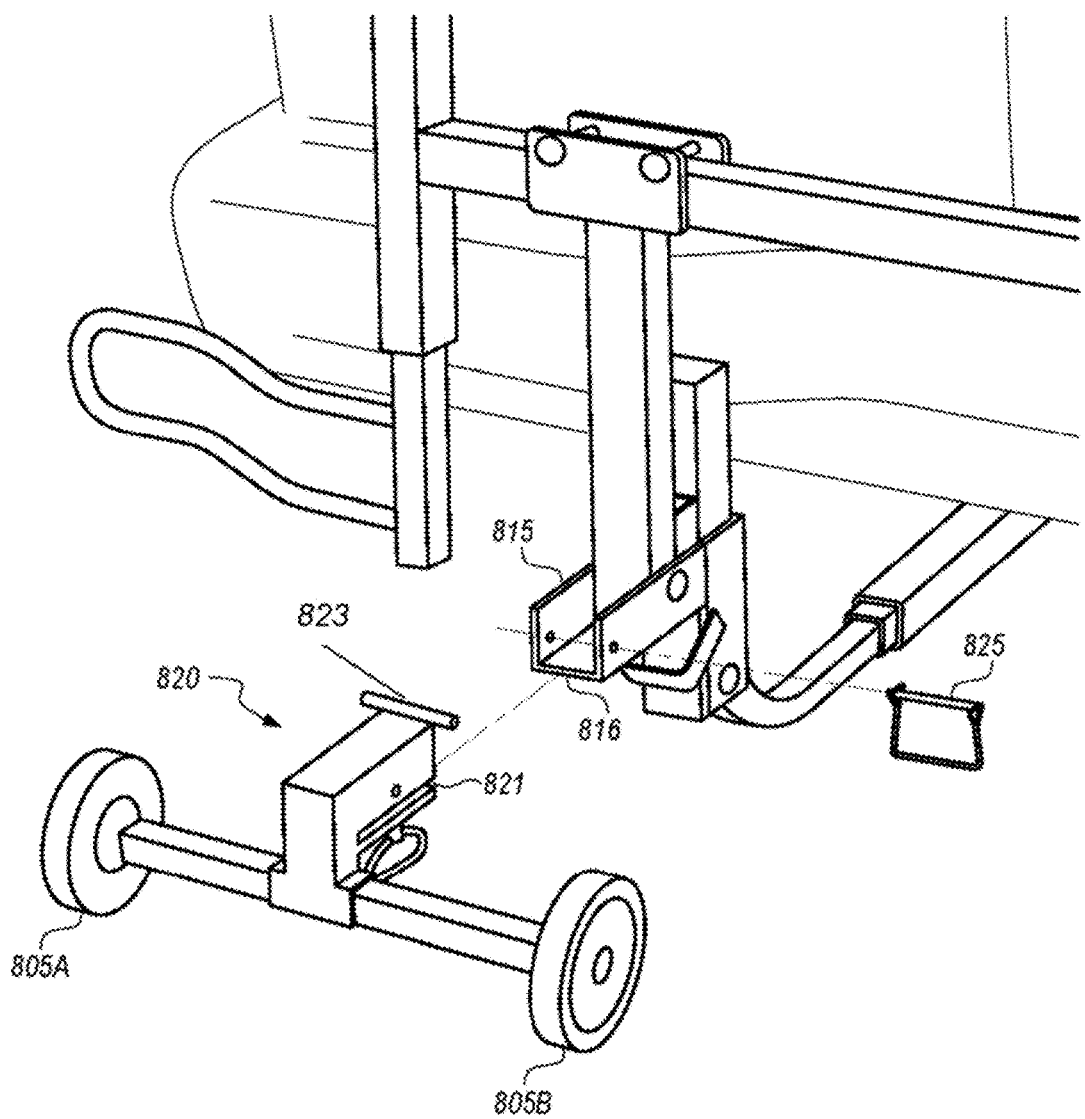
FIG. 8 is a diagram of a carrier or rack like that of FIG. 7 showing how wheels may be provided as an after-market accessory that attaches to the carrier or rack.

Another embodiment is shown in FIG. 7. A carrier or rack 700, such as a trike carrier or rack, is provided with wheels 705A and 705B. The wheels may be removable, allowing the wheels and associated hardware may be provided in kit form and purchased separately from the carrier and later installed on the carrier. Referring to FIG. 8, for example, in one specific embodiment, wheels 805 are provided with a tongue-in-groove-type attachment mechanism in which a bottom portion 816 of a channel member 815 serves as a tongue that fits within a groove 821 of a wheel assembly 820. A rod 823 is provided so as to sit atop the channel member 815. A retainer member 825 is inserted through holes in the channel member and in the wheel assembly to hold the wheel assembly in place.

In the embodiment of FIG. 7, the wheels are attached in such a way that, for the carrier or rack to be unfolded, it is necessary to remove the wheels from the carrier or rack. That is, the wheels are only attached while they are needed, during wheeling about of the carrier or rack and mounting the carrier or rack to the hitch. In other embodiments, alternative mounting arrangements may be used to allow the wheels to remain attached to the carrier or rack when the carrier or rack is unfolded.

In another embodiment, shown in FIG. 9, the wheels may be permanently attached. A carrier or rack 900, such as a trike carrier or rack, is provided with wheels 905A and 905B. As shown in FIG. 10, the wheels are attached (e.g., permanently welded) in such as way as to avoid any interference with operation of the carrier or rack. In particular, a channel member 915 is unobstructed to allow for lowering of a column member 907.

It will be appreciated by those skilled in the art that the present invention may be embodied in other specific forms without departing from the spirit or essential character thereof. The disclosed embodiments are therefore intended in all respects to be illustrative and not restrictive. The scope of the invention is indicated by the appended claims rather than the foregoing description, and all changes that come within the scope and range of equivalents thereof are intended to be embraced therein.

What is claimed is:

1. A method of attaching a rack or carrier to a trailer hitch of a vehicle, the rack or carrier comprising a bar that is received within a receiver of the trailer hitch and a plurality of wheels aligned with respect to a common axis of rotation, comprising:
    applying a levering action to the rack or carrier so as to cause rotation about the common axis of rotation, and inserting the bar into the receiver;
    applying a lifting action to the rack or carrier with the bar partially inserted into the receiver, the receiver acting as a fulcrum; and
    pushing the rack or carrier forward, causing the bar to be fully inserted into the receiver.

2. The method of claim 1, comprising stowing the wheels in a stowed position in which the plurality of wheels are no longer aligned with respect to the common axis of rotation.

3. The method of claim 1, comprising stowing the wheels in a horizontal position.

4. A rack or carrier for mounting to a trailer hitch of a vehicle, comprising
    a bar that is received within a receiver of the trailer hitch;
    a plurality of support members permanently affixed to the bar for supporting an item to be carried;
    a plurality of oblong loop members each for receiving a bicycle wheel;
    a plurality of wheels coupled to the support members and having a configuration in which the plurality of wheels are aligned with respect to a common axis of rotation, the rack or carrier being configured so as to enable it to be wheeled about using wheels that include only the plurality of wheels.

5. The rack or carrier of claim 4, comprising an engagement member for engaging with a trailer hitch, wherein the engagement member is curved or angled such that in a full engagement condition, the plurality of wheels are elevated to a greater extent as a result of the engagement member being curved or angled.

6. The rack or carrier of claim 4, wherein the plurality of wheels is configured so as to be removable.

7. The rack or carrier of claim 4, wherein the plurality of wheels is configured so as to be removable without the use of tools.

8. The rack or carrier of claim 4, wherein a weight distribution of the rack or carrier is such that the rack or carrier stands upright supported by the plurality of wheels and the engagement member without any additional support.

9. A rack or carrier for mounting to a trailer hitch of a vehicle, comprising:
- a plurality of support members for supporting an item to be carried;
- an engagement member for engaging with a trailer hitch, wherein the engagement member is curved or angled; and
- an attachment member for receiving a wheel assembly comprising a plurality of wheels to be removably coupled to the support members;
- wherein the attachment member is located such that when the wheel assembly is attached to the attachment member the plurality of wheels are elevated above the trailer hitch.

10. A method of handling a rack or carrier comprising a plurality of oblong loop members each for receiving a bicycle wheel to a trailer hitch of a vehicle, the method comprising:
- attaching to the rack or carrier a removable wheel assembly comprising a plurality of wheels having a configuration in which the plurality of wheels are aligned with respect to a common axis of rotation;
- removing a bicycle from or loading a bicycle onto the rack or carrier; and
- wheeling about the rack or carrier using wheels that include only the plurality of wheels.

11. A method of handling a rack or carrier, the rack or carrier comprising an engagement member for engaging a trailer hitch, a plurality of oblong loop members each for receiving a bicycle wheel, and a plurality of wheels having a configuration in which the plurality of wheels are aligned with respect to a common axis of rotation, the method comprising:
- removing a bicycle from or loading a bicycle onto the rack or carrier;
- wheeling about the rack or carrier using wheels that include only the plurality of wheels; and
- standing the rack or carrier upright supported by the plurality of wheels and the engagement member without any additional support.

* * * * *